US009241281B2

(12) United States Patent
Pulini et al.

(10) Patent No.: US 9,241,281 B2
(45) Date of Patent: Jan. 19, 2016

(54) APPARATUS AND METHOD FOR REPORTING OF COMMUNICATION PATH QUALITY WITHIN A WIRELESS NETWORK

(71) Applicant: Honeywell International, Inc., Morristown, NJ (US)

(72) Inventors: Christopher Pulini, Ambler, PA (US); Jeffrey B. Scott, Lexington, VA (US); Norman R. Swanson, Douglassville, PA (US); Niral Sanghavi, Wilmington, DE (US)

(73) Assignee: Honeywell International Inc., Morris Plains, NJ (US)

( * ) Notice: Subject to any disclaimer, the term of this patent is extended or adjusted under 35 U.S.C. 154(b) by 72 days.

(21) Appl. No.: 13/948,077

(22) Filed: Jul. 22, 2013

(65) Prior Publication Data
US 2014/0369211 A1 Dec. 18, 2014

Related U.S. Application Data

(60) Provisional application No. 61/834,025, filed on Jun. 12, 2013.

(51) Int. Cl.
*H04W 24/10* (2009.01)
*H04W 24/08* (2009.01)
*H04W 84/18* (2009.01)

(52) U.S. Cl.
CPC ............. *H04W 24/10* (2013.01); *H04W 24/08* (2013.01); *H04W 84/18* (2013.01)

(58) Field of Classification Search
None
See application file for complete search history.

(56) References Cited

U.S. PATENT DOCUMENTS

| 4,688,224 | A | * | 8/1987 | Dal Degan et al. ........... 714/747 |
| 5,293,639 | A | * | 3/1994 | Wilson et al. .................... 455/17 |
| 5,333,175 | A | * | 7/1994 | Ariyavisitakul et al. ...... 455/423 |
| 6,035,183 | A | * | 3/2000 | Todd .................... H04B 7/0814 455/101 |
| 6,487,604 | B1 | * | 11/2002 | Rochford ................ H04L 41/22 709/220 |
| 6,522,881 | B1 | * | 2/2003 | Feder et al. .................... 455/437 |
| 8,396,007 | B2 | | 3/2013 | Gonia et al. |
| 2002/0081977 | A1 | * | 6/2002 | McCune, Jr. ................. 455/67.1 |
| 2003/0040319 | A1 | * | 2/2003 | Hansen et al. ................ 455/452 |

(Continued)

FOREIGN PATENT DOCUMENTS

| EP | 2018007 A | 1/2009 |
| WO | WO 2006/021791 A1 | 3/2006 |
| WO | WO 2006/122287 A2 | 11/2006 |

OTHER PUBLICATIONS

Extended European Search Report dated Nov. 25, 2014 in connection with European Patent Application No. 14169550.2; 7 pages.

*Primary Examiner* — Dung B Huynh

(57) ABSTRACT

A method includes identifying multiple statistics associated with each of multiple wireless connections. The multiple wireless connections form a single communication path between two wireless nodes in a wireless network. The method also includes identifying an overall quality associated with the communication path using the statistics. The method can also include assigning a quality value to each statistic for each wireless connection, where the overall quality is based on at least one of the quality values assigned to the statistics (such as a lowest of the quality values). The statistics could include a Received Signal Quality Indicator (RSQI), a Received Signal Strength Indication (RSSI), and a transmit success/fail ratio. The quality value assigned to each statistic could include a "good" quality, a "fair" quality, or a "poor" quality.

20 Claims, 8 Drawing Sheets

(56) References Cited

U.S. PATENT DOCUMENTS

| | | | |
|---|---|---|---|
| 2003/0126221 A1* | 7/2003 | Tanaka | H04L 41/026 709/206 |
| 2003/0139136 A1* | 7/2003 | Pattabiraman | 455/41 |
| 2004/0064760 A1* | 4/2004 | Hicks | H04L 12/2697 714/43 |
| 2004/0203459 A1* | 10/2004 | Borras-Chia et al. | 455/67.13 |
| 2005/0030905 A1* | 2/2005 | Luo et al. | 370/253 |
| 2005/0068970 A1* | 3/2005 | Srikrishna et al. | 370/400 |
| 2006/0020697 A1* | 1/2006 | Kelso et al. | 709/224 |
| 2006/0040707 A1* | 2/2006 | Kish et al. | 455/562.1 |
| 2006/0268879 A1 | 11/2006 | Xhafa et al. | |
| 2007/0179721 A1 | 8/2007 | Yaney | |
| 2007/0225013 A1 | 9/2007 | Pflum et al. | |
| 2007/0248012 A1* | 10/2007 | Glinsman | H04L 12/66 370/332 |
| 2007/0291660 A1 | 12/2007 | Robson et al. | |
| 2008/0205290 A1 | 8/2008 | Wille et al. | |
| 2008/0205292 A1 | 8/2008 | Denby et al. | |
| 2008/0205420 A1 | 8/2008 | Srikrishna et al. | |
| 2009/0022061 A1 | 1/2009 | Walley et al. | |
| 2009/0059814 A1* | 3/2009 | Nixon | H04L 41/12 370/254 |
| 2009/0073893 A1* | 3/2009 | Vu Duong et al. | 370/253 |
| 2009/0185492 A1 | 7/2009 | Senarath et al. | |
| 2009/0213771 A1 | 8/2009 | Celentano et al. | |
| 2010/0031110 A1* | 2/2010 | Seok et al. | 714/748 |
| 2010/0074141 A1 | 3/2010 | Nguyen | |
| 2010/0091747 A1* | 4/2010 | Dorsey | H04B 1/036 370/338 |
| 2010/0278103 A1* | 11/2010 | Park et al. | 370/328 |
| 2010/0304738 A1* | 12/2010 | Lim | 455/426.1 |
| 2011/0119401 A1* | 5/2011 | Kish et al. | 709/243 |
| 2011/0122842 A1 | 5/2011 | Kim | |
| 2012/0058769 A1* | 3/2012 | Tomita et al. | 455/437 |
| 2012/0113859 A1* | 5/2012 | Jung et al. | 370/252 |
| 2012/0155299 A1* | 6/2012 | Reams | 370/252 |
| 2012/0163192 A1* | 6/2012 | Bae | 370/242 |
| 2013/0010601 A1 | 1/2013 | Senarath et al. | |
| 2013/0013667 A1* | 1/2013 | Serena | G06Q 10/10 709/203 |
| 2013/0038502 A1* | 2/2013 | Erdem | 343/861 |
| 2013/0250786 A1* | 9/2013 | Balasaygun et al. | 370/252 |
| 2013/0308592 A1* | 11/2013 | Kitou et al. | 370/329 |
| 2014/0003342 A1* | 1/2014 | Sheriff et al. | 370/328 |
| 2014/0126397 A1* | 5/2014 | Hansen et al. | 370/252 |
| 2014/0226547 A1* | 8/2014 | Zainaldin | 370/311 |

* cited by examiner

600 ⟶

Devices: fdap_0045, temp_02C3
Type: Secondary Routing, Secondary Time Sync
RSQI: 255, RSSI: -42dBm, TxFailRatio: 0%
Overall Status: Good

700 ⟶

Devices: fdap_0048 to fdap_0045
Type: Primary Time Sync
Clock Sigma: -315, Time Master Address: 3, Time Distribution Level: 1
RSQI: 253, RSSI: -27/-33dBm, TxFailRatio: 0%
Overall Status: Good

Connection Status Summary

Report Generated By: administrator
2/12/2013 3:49:35 PM

The Connection Summary Report provides information about communications redundancy, and signal strength and quality

| Device Information | | Primary Parent | | Secondary Parent | |
|---|---|---|---|---|---|
| Tag Name: | MN_010203 | Tag Name: | MN_0600DD | Tag Name: | |
| Type: | Access Point | Network Address: | 7 | Network Address: | 0 |
| Network Address: | 8 | RSQI: | 255 | RSQI: | |
| Redundancy State: | Not Applicable | RSSI: | -42 | RSSI: | |
| Redundancy Ratio: | 0 | TxFailRatio: | 13 | TxFailRatio: | |
| | | Overall Status: | Good | Overall Status: | |
| Tag Name: | MN_0600DD | Tag Name: | fdap_0055 | Tag Name: | |
| Type: | Access Point | Network Address: | 3 | Network Address: | 0 |
| Network Address: | 7 | RSQI: | 98 | RSQI: | |
| Redundancy State: | Not Applicable | RSSI: | -61 | RSSI: | |
| Redundancy Ratio: | 0 | TxFailRatio: | 0 | TxFailRatio: | |
| | | Overall Status: | Poor | Overall Status: | |
| Tag Name: | fdap_0055 | Tag Name: | | Tag Name: | |
| Type: | Access Point | Network Address: | 3 | Network Address: | 0 |
| Network Address: | 3 | RSQI: | | RSQI: | |
| Redundancy State: | Not Applicable | RSSI: | | RSSI: | |
| Redundancy Ratio: | 0 | TxFailRatio: | | TxFailRatio: | |
| | | Overall Status: | | Overall Status: | |
| Tag Name: | MN_0600EC | Tag Name: | MN_010203 | Tag Name: | MAIDI_14( |
| Type: | Routing | Network Address: | 8 | Network Address: | 11 |
| Network Address: | 6 | RSQI: | 249 | RSQI: | 255 |
| Redundancy State: | Redundant | RSSI: | -63 | RSSI: | -48 |
| Redundancy Ratio: | 99 | TxFailRatio: | 3 | TxFailRatio: | 0 |
| | | Overall Status: | Good | Overall Status: | Good |

Data Preview

Connection History

The Connection History Report provides detailed information about the history of connection dynamics

| History | Connection | | Status | |
|---|---|---|---|---|
| Date/Time: 2/21/2013 10:08:26 AM<br>Reason: Update (Active) | Connection ID:<br>Receiving Tag Name:<br>Receiving Type:<br>Receiving Network Address:<br>Ending Tag Name:<br>Ending Network Address: | 0003/0011<br>T0004E7BC0A80002<br>Access Point<br>3<br>T000000000000000B<br>11 | RSQI:<br>RSSI:<br>Tx Fail Ratio:<br>Overall Status: | 249<br>-63<br>0<br>Good |
| Date/Time: 2/21/2013 10:08:26 AM<br>Reason: Update (Active) | Connection ID:<br>Receiving Tag Name:<br>Receiving Type:<br>Receiving Network Address:<br>Ending Tag Name:<br>Ending Network Address: | 0003/0005<br>T0004E7BC0A80002<br>Access Point<br>3<br>[Deleted]<br>6 | RSQI:<br>RSSI:<br>Tx Fail Ratio:<br>Overall Status: | 147<br>-59<br>0<br>Poor |
| Date/Time: 2/21/2013 10:08:26 AM<br>Reason: Update (Active) | Connection ID:<br>Receiving Tag Name:<br>Receiving Type:<br>Receiving Network Address:<br>Ending Tag Name:<br>Ending Network Address: | 0003/0004<br>T0004E7BC0A80002<br>Access Point<br>3<br>[Deleted]<br>4 | RSQI:<br>RSSI:<br>Tx Fail Ratio:<br>Overall Status: | 128<br>-77<br>0<br>Poor |
| Date/Time: 2/21/2013 10:08:18 AM<br>Reason: Update (Active) | Connection ID:<br>Receiving Tag Name:<br>Receiving Type:<br>Receiving Network Address: | 0008/0010<br>T000000000000000A<br>Device, Routing<br>10 | RSQI:<br>RSSI:<br>Tx Fail Ratio:<br>Overall Status: | 255<br>-58<br>0<br>Good |

Data Preview

Device History

The Device History Report provides detailed information about the history of connection changes between devices Report Generated By: administrator
2/25/2013 8:50:23 AM

| History/Device | | Primary Devices | | Secondary Devices | |
|---|---|---|---|---|---|
| Date/Time: | 2/21/2013 10:04:26.014 AM | Parent Tag Name: | MN_010203 | Parent Tag Name: | [Undefined] |
| Reason: | Update | Parent Address: | 8 | Parent Address: | 0 |
| Tag Name: | MAIDI_1403 | Access Point Tag Name: | MN_010203 | Access Point Tag Name: | [Undefined] |
| Type: | Device, Routing | Access Point Address: | 8 | Access Point Address: | 0 |
| Network Address: | 11 | Time Sync Tag Name: | MN_010203 | Time Sync Tag Name: | [Undefined] |
| Redundancy State: | Non Redundant | Time Sync Address: | 8 | Time Sync Address: | 0 |
| Routing Level: | 1 | | | | |
| Time Master Tag Name: | MN_0600DD | | | | |
| Time Master Address: | 7 | | | | |
| Time Distribution Level: | 2 | | | | |
| Date/Time: | 2/21/2013 10:04:07.055 AM | Parent Tag Name: | [Undefined] | Parent Tag Name: | [Undefined] |
| Reason: | Add | Parent Address: | 0 | Parent Address: | 0 |
| Tag Name: | fdap_0055 | Access Point Tag Name: | [Undefined] | Access Point Tag Name: | [Undefined] |
| Type: | Access Point | Access Point Address: | 0 | Access Point Address: | 0 |
| Network Address: | 3 | Time Sync Tag Name: | fdap_0055 | Time Sync Tag Name: | fdap_0055 |
| Redundancy State: | Not Applicable | Time Sync Address: | 3 | Time Sync Address: | 3 |
| Routing Level: | | | | | |
| Time Master Tag Name: | fdap_0055 | | | | |
| Time Master Address: | 3 | | | | |
| Time Distribution Level: | 0 | | | | |
| Date/Time: | 2/21/2013 10:04:04.568 AM | Parent Tag Name: | MN_0600DD | Parent Tag Name: | [Undefined] |
| Reason: | Add | Parent Address: | 7 | Parent Address: | 0 |
| Tag Name: | TEMP_DI_1407 | Access Point Tag Name: | MN_0600DD | Access Point Tag Name: | [Undefined] |
| Type: | Device, Routing | Access Point Address: | 7 | Access Point Address: | 0 |
| Network Address: | 10 | Time Sync Tag Name: | MN_0600DD | Time Sync Tag Name: | [Undefined] |
| Redundancy State: | Non Redundant | Time Sync Address: | 7 | Time Sync Address: | 0 |

APPARATUS AND METHOD FOR REPORTING OF COMMUNICATION PATH QUALITY WITHIN A WIRELESS NETWORK

CROSS-REFERENCE TO RELATED APPLICATION AND PRIORITY CLAIM

This application claims priority under 35 U.S.C. §119(e) to U.S. Provisional Patent Application No. 61/834,025 filed on Jun. 12, 2013, which is hereby incorporated by reference in its entirety.

TECHNICAL FIELD

This disclosure relates generally to wireless communication systems. More specifically, this disclosure relates to an apparatus and method for reporting of communication path quality within a wireless network.

BACKGROUND

Wireless networks are frequently used in industrial process control systems. For example, a process control system often includes sensors that provide measurements over a wireless network and actuators that receive control signals over the wireless network. A process controller can use the measurements from the sensors to generate the control signals for the actuators.

A wireless network may contain any number of communication paths between different devices in the network. Communication paths may be unidirectional (having one unidirectional connection between devices) or bidirectional (having two unidirectional connections between devices, one in each direction). A user may wish to measure or monitor the quality of individual communication paths within the network. There are several statistics that can be used to measure the quality of a wireless connection, including a Received Signal Quality Indicator (RSQI), a Received Signal Strength Indication (RSSI), or a transmit success/fail ratio. Statistics typically apply to a single unidirectional connection.

SUMMARY

This disclosure provides an apparatus and method for reporting of communication path quality within a wireless network.

In a first embodiment, a method includes identifying multiple statistics associated with each of multiple wireless connections. The multiple wireless connections form a single communication path between two wireless nodes in a wireless network. The method also includes identifying an overall quality associated with the communication path using the statistics.

In a second embodiment, an apparatus includes at least one processing device configured to (i) obtain multiple statistics associated with each of multiple wireless connections forming a single communication path between two wireless nodes in a wireless network and (ii) identify an overall quality associated with the communication path using the statistics. The apparatus also includes at least one memory configured to store the overall quality.

In a third embodiment, a non-transitory computer readable medium embodies a computer program. The computer program includes computer readable program code for obtaining multiple statistics associated with each of multiple wireless connections. The multiple wireless connections form a single communication path between two wireless nodes in a wireless network. The computer program also includes computer readable program code for identifying an overall quality associated with the communication path using the statistics.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 8 through 10 illustrate example reports for disclosing or using communication path quality within a wireless network according to this disclosure.

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
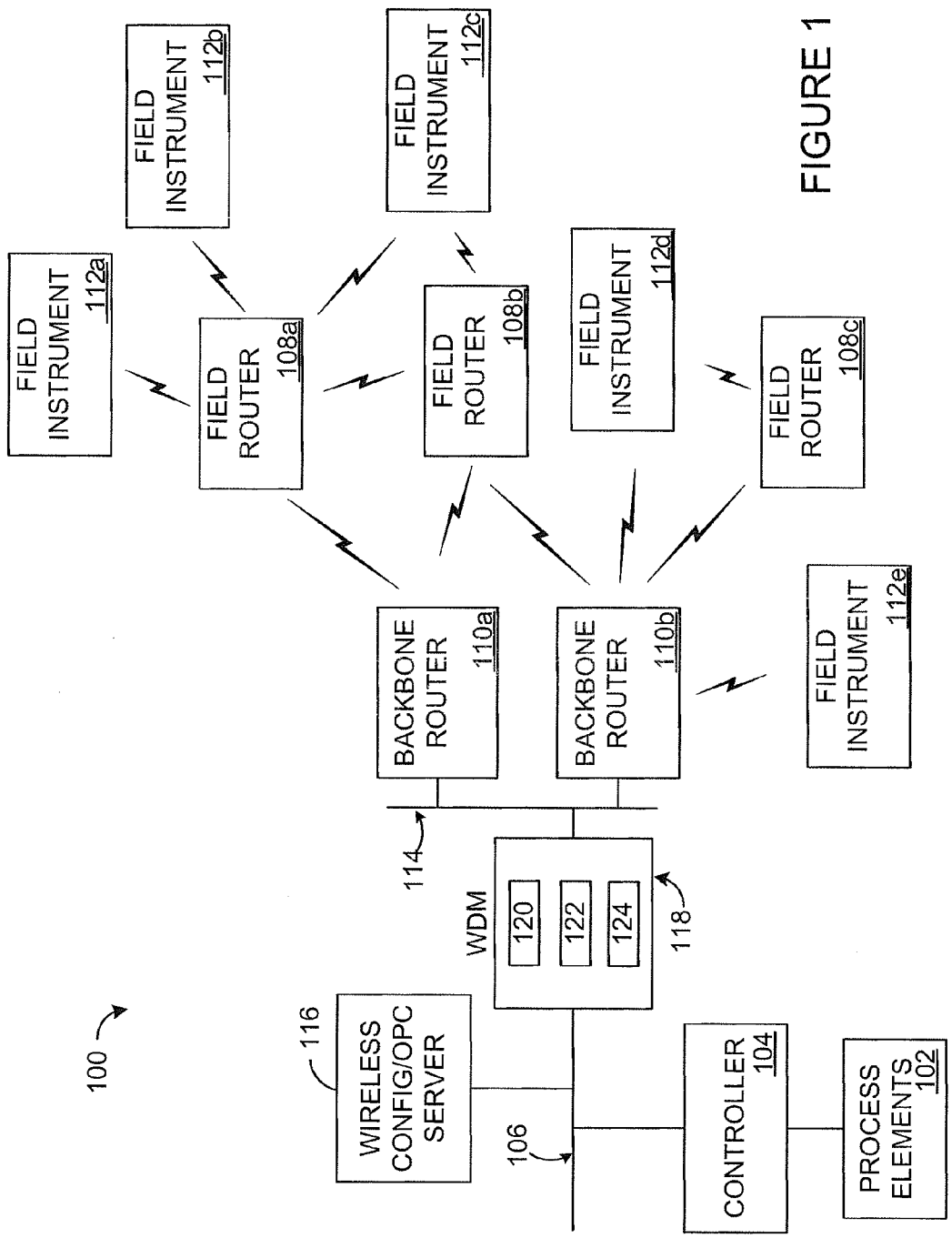
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100 Wireless or WirelessHART.

In this example, the field routers 108a-108c and backbone routers 110a-110b generally represent routing devices that store and forward messages for other devices. Field routers 108a-108c may be battery-powered or otherwise locally powered, and backbone routers 110a-110b may be line-powered or receive operating power from external sources (such as AC supply lines). However, each field or backbone router could be powered in any suitable manner. The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. In particular embodiments, the field routers 108a-108c could represent field device access points (FDAPs) that are not connected via wired Ethernet and may be locally powered, and the backbone routers 110a-110b could represent FDAPs that are connected via wired Ethernet and may be line powered. The backbone network 114 includes any suitable network for transporting data, such as a FAULT TOLERANT ETHERNET network, a wireless mesh network, or other wired or wireless network.

A wireless configuration and OLE for Process Control (OPC) server 116 can configure and control various aspects of the system 100 via a wireless device manager (WDM) 118. For example, the server 116 allows for the control of process elements 102 via the controller 104 and via the WDM 118, which configures the operation of the field routers 108a-108c, backbone routers 110a-110b, and field instruments 112a-112e. The server 116 could also support security in the system 100, such as by allowing for the WDM 118 to distribute cryptographic keys or other security data to various wireless devices or other components. The server 116 includes any suitable structure for operating industrial control and automation system 100.

The WDM 118 supports various functional components used to manage and interact with a wireless network. For example, the WDM 118 can include a gateway 120, a security manager 122, and a system manager 124. The gateway 120 performs various translation functions, allowing information to be exchanged between networks using different protocols. For instance, the gateway 120 could translate between one or more wired Ethernet protocols and one or more wireless protocols. The security manager 122 performs various security-related functions, such as functions to allow only authorized traffic to flow between the networks 106, 114. The system manager 124 performs various management functions to manage a wireless network. For example, the system manager 124 could collect quality statistics and calculate overall qualities of communication paths in a wireless network. The system manager 124 can also be responsible for choosing communication paths for each device and managing any resources needed to communicate over the wireless network (such as by allocating communication slots and coordinating slot allocations between different devices).

Each functional component 120-124 in the WDM 118 could be implemented in any suitable manner. For example, each functional component 120-124 could be implemented using hardware or a combination of hardware and software/firmware instructions. Also, hardware can be shared between the functional components 120-124, such as when the same processing devices are used to execute instructions of the functional components 120-124. While shown as forming part of a single WDM 118, one or more functional components 120-124 could be implemented as separate components.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multifunctional, plant-wide coverage for wireless sensing, asset location tracking, personnel tracking, wireless communications, and any other or additional functionality as desired.

In general, each communication path in a wireless network can be represented by one or more unidirectional wireless connections between two devices. Typically, a bidirectional communication path can be represented by a unidirectional connection from device A to device B and a unidirectional connection from device B to device A. An aggregate of multiple statistics (such as RSQI, RSSI, and transmit success/fail ratio values) across multiple connections (such as A-to-B and B-to-A connections) can be used to assign an overall quality to a communication path. The overall quality of the communication path may be represented in one of multiple classifications that can be described using common descriptions easily understandable by a user (such as "poor," "fair," and "good"). Prior approaches that used a single statistic to measure connection quality might equate a good statistic value with a good communication path, even though this communication path might sometimes behave poorly in real-world installations. The approach here helps to avoid that situation by combining multiple statistics into a more complete view of a communication path's quality.

In accordance with this disclosure, a monitoring application could represent or be executed by the system manager 124. The monitoring application collects various statistics associated with one or more available connections in a wireless network, such as RSQI, RSSI, and transmit success/fail ratio statistics. Quality thresholds can be assigned for each statistic, such as thresholds dividing each statistic into "good," "fair," and "poor" ranges (although other or additional ranges could be used). The thresholds may be system-assigned or user-assigned. For example, a system or user may assign different RSQI thresholds of "good" (values between 180 and 255), "fair" (values between 150 and 179), and "poor" (values between 0 and 149).

The monitoring application also creates an aggregate of all statistics on all connections for a communication path, and the monitoring application assigns an overall quality to the communication path based upon the aggregate. For example, consider a communication path formed by two connections between device A and device B (an A-to-B connection and a B-to-A connection). All statistics in the A-to-B connection are within the "good" range, the RSQI statistic in the B-to-A connection is within the "poor" range, and all other statistics in the B-to-A connection are within the "good" range. The monitoring application may therefore assign an overall quality of "poor" to the communication path. In this way, the monitoring application is able to assign an overall quality to each communication path using a collection of statistics for that communication path. Additional details regarding the identification of communication path quality in a wireless network are provided below.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where the identification of communication path quality can be identified. This functionality could be used in any other suitable system.

Figures 2, 6, 7:
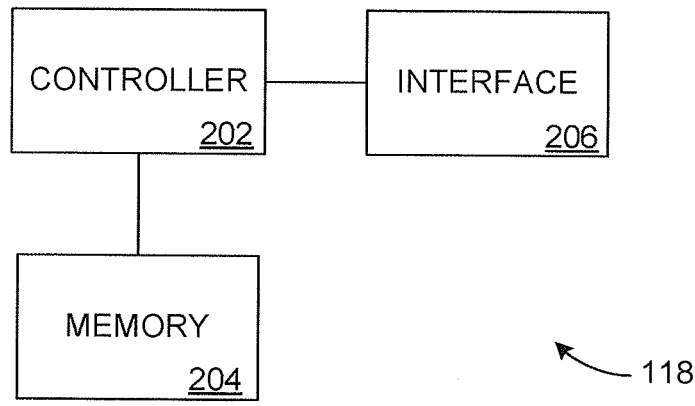
FIG. 2 illustrates an example wireless device manager or other device executing a monitoring application in an industrial control and automation system according to this disclosure.
FIGS. 3 through 7 illustrate an example graphical display for reporting of communication path quality within a wireless network and related details according to this disclosure.

FIG. 2 illustrates an example wireless device manager (WDM) 118 or other device executing a monitoring application in an industrial control and automation system according to this disclosure. As noted above, the monitoring application could represent or form at least a part of the system manager 124.

As shown in FIG. 2, the device includes a controller 202, which controls the overall operation of the device. For example, the controller 202 may identify different statistics of one or more wireless connections in one or more communication paths of a wireless network. The controller 202 may also aggregate statistics for all connections associated with each communication path and identify an overall quality of each communication path. The controller 202 includes any suitable structure for controlling operation of a device. As particular examples, the controller 202 could represent at least one processor, microprocessor, microcontroller, field programmable gate array, digital signal processor, or other processing or control device.

A memory 204 is coupled to the controller 202. The memory 204 stores any of a wide variety of information used, collected, or generated by the device. For example, the memory 204 could store connection statistics and communication path qualities. The memory 204 includes any suitable volatile and/or non-volatile storage and retrieval device(s).

The device also includes one or more interfaces 206 configured to communicate with external devices and systems. For example, the interfaces 206 could include one or more Ethernet or other wired network interfaces supporting communications over one or more wired networks (such as the networks 106, 114). The interfaces 206 could also include one or more RF or other wireless network interfaces supporting communications over one or more wireless networks. The interface(s) 206 can be used in any suitable manner, such as to receive information identifying wireless connection statistics or to receive wireless signals for which connection statistics can be calculated. Each interface 206 includes any suitable structure for transmitting and/or receiving signals over a network.

In particular embodiments, the device shown in FIG. 2 can be used to execute a monitoring application that monitors the quality of one or more wireless communication paths. The wireless communication paths could include communication paths over which the device in FIG. 2 communicates directly and/or communication paths over which the device in FIG. 2 does not communicate directly.

Once the quality of a communication path has been determined, the quality of the communication path can be used in any suitable manner. For example, a user interface could display the overall quality of the communication path using user-friendly terms (such as "good," "fair," or "poor"). As another example, the system manager 124 could automatically choose the best available communication path for two network devices based upon the overall qualities of multiple communication paths (when multiple communication paths are available). The quality of a communication path could be used by the device 118 or any other device or system in any suitable manner.

Although FIG. 2 illustrates one example of a WDM 118 or other device executing a monitoring application in an industrial control and automation system, various changes may be made to FIG. 2. For example, various components in FIG. 2 could be combined, subdivided, or omitted and additional components could be added according to particular needs.

FIGS. 3 through 7 illustrate an example graphical display 300 for reporting of communication path quality within a wireless network and related details according to this disclosure. The graphical display 300 represents one example way in which a communication path quality could be used. The graphical display 300 could be generated by any suitable device or system (such as the system manager 124) and presented on any suitable device or system (such as a control room display screen).

Figure 3:
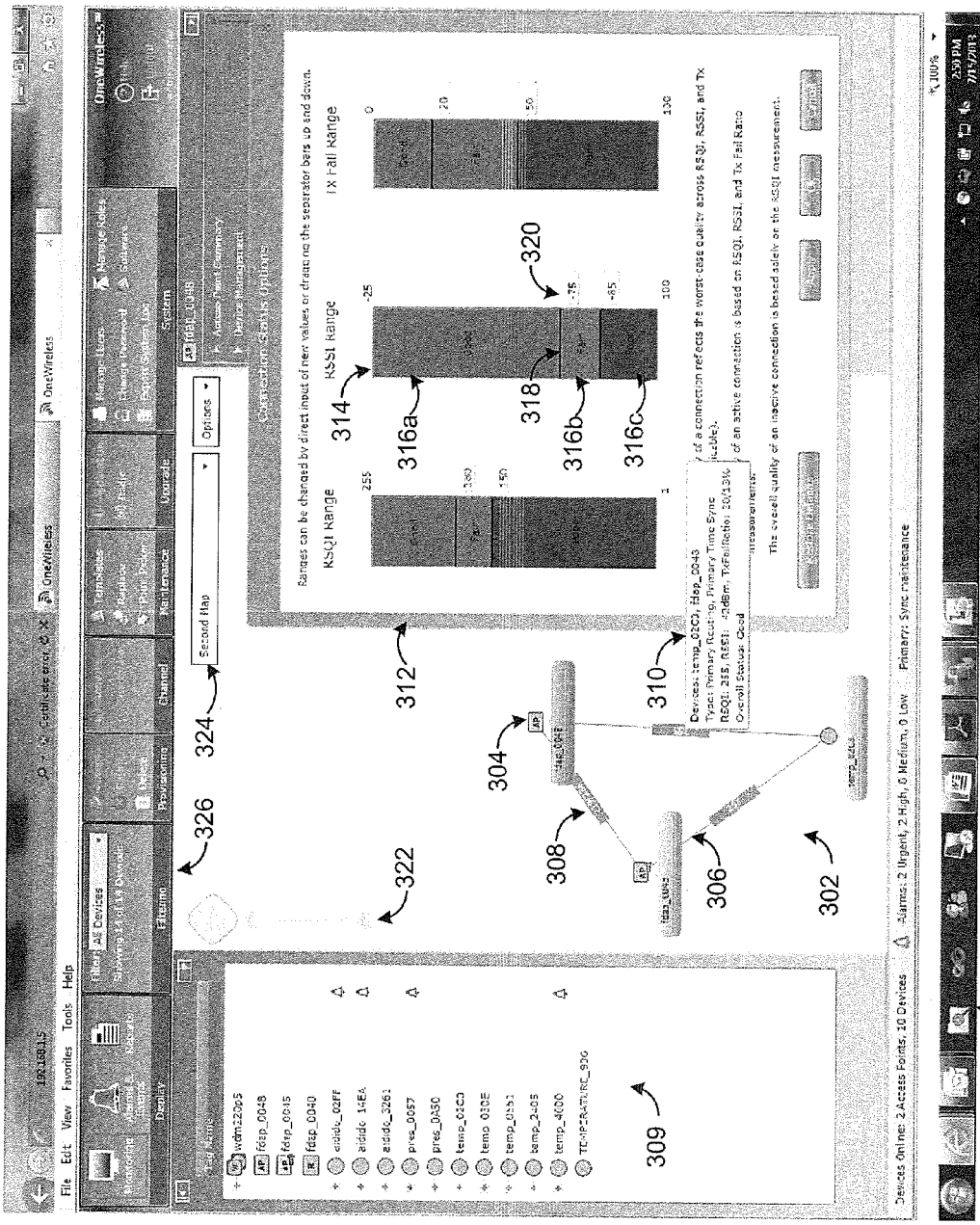

As shown in FIG. 3, the graphical display 300 includes a network map 302, which identifies nodes of a wireless network and communication paths between those nodes. In this example, the network map 302 includes icons 304 representing network nodes and lines 306 representing communication paths between those nodes. Note that this represents a simplified example of a network map 302 and that the network map 302 can include a large number of nodes and communication paths.

Each line 306 representing a communication path can include a label 308. The label 308 in this example includes one or more statistical values. If the communication path represented by a line 306 is bidirectional and a significant difference exists between the statistical values in opposite directions, the label 308 for that line 306 can identify the statistical value for each direction of the communication path. As shown in FIG. 3, the labels 308 identify RSQI values, although other or additional statistical values could be shown in the labels 308.

The graphical display 300 also includes a list 309 of the wireless devices contained within the network map 302. Each device identified in the list 309 could be selected to highlight that device in the network map 302.

If one of the wireless devices in the network map 302 or the list 309 is selected by a user (such as via a mouse, touchscreen, or other input device), a pop-up window 310 can be displayed in proximity to the selected device's icon 304. The pop-up window 310 can be used to display additional information about a communication path represented by a line 306. For example, the pop-up window 310 can be displayed when the user positions a mouse or other pointer device over the line 306, over the label 308 of that line 306, or over another feature of the line 306 (such as an arrow representing a direction data flow).

The pop-up window 310 here includes an identity of the two devices linked by the communication path, a purpose of the communication path, one or more statistical values for the communication path, and an overall status of the communication path. With respect to the purpose of the path, active connections can be used for different purposes, such as "routing" for data routing, "clock" for clock synchronization, or "high speed" for high speed publications (any combination of purposes can be used with the same connection). Also, a communication path can be the primary or secondary path for each purpose. Inactive connections may not be used for any purpose but may be activated if an existing active connection becomes unavailable. As noted above, statistical values for connections in both directions of a communication path are calculated, and the statistical values for both directions are shown in the pop-up window 310 and separated by slashes. The overall status of the communication path can be determined using the aggregate of the statistics in both directions.

The graphical display 300 also includes a connection status options box 312, which can be used by a user to define ranges of values for each statistic associated with a communication path. In this example, the options box 312 allows a user to define "good," "fair," and "poor" ranges for RSQI, RSSI, and transmit success/fail ratio values. Note, however, that other or additional ranges and/or other or additional statistics could be used.

For each statistic, the options box 312 includes a bar 314 that is divided into multiple sections 316a-316c. Lines 318 represent horizontal separators that separate adjacent sections and that are positioned on top and on bottom of each bar 314. Each line 318 is associated with a value in a text box 320.

The various sections 316a-316c of each bar 314 define the ranges of values for one of the statistics. In this example, the left bar indicates that RSQI values from 181 to 255 are good, RSQI values from 151 to 180 are fair, and RSQI values from 1 to 150 are poor. The center bar indicates that RSSI values from −74 to −25 are good, RSSI values from −84 to −75 are fair, and RSSI values from −100 to −85 are poor. The right bar indicates that transmit success/fail ratio values from 0 to 19 are good, ratio values from 20 to 49 are fair, and ratio values from 50 to 100 are poor.

These ranges can be adjusted by the user in any suitable manner. For example, the user could enter data values directly into the text boxes 320, such as via a keyboard or keypad. The user could also use a mouse or other pointer device to select and move the lines 318, which could automatically update the values shown in the text boxes 320. Any other suitable mechanism can be used to define the ranges of values for the statistics. A text box 320 can be highlighted a particular color (such as light yellow) or another indicator can be used to identify a value that has changed and not yet been confirmed (via selection of the "OK" or "Apply" button). If a user enters an invalid value into a text box 320, an error icon can be presented next to the text box 320.

As noted within the options box 312, the overall quality of a communication path can represent the lowest range for any statistic associated with that communication path. In the example given above, all statistics in an A-to-B connection are within the "good" range, the RSQI statistic in a B-to-A connection is within the "poor" range, and all other statistics in the B-to-A connection are within the "good" range. The monitoring application may therefore assign an overall quality of "poor" to the communication path.

Also as noted within the options box 312, the overall quality of an active communication path (a communication path currently being used by active devices) is based on all three statistics. In contrast, the overall quality of an inactive communication path (a communication path not currently being used by active devices) is based on one statistic only, such as the RSQI statistic. This is for illustration only, and the quality of an inactive communication path could be based on any other single statistic or collection of statistics.

Additional controls can also be provided in the graphical display 300. For example, controls 322 allow a user to navigate up, down, left, and right in the network map 302 and to zoom in and zoom out within the network map 302. Controls 324 allow a user to select different network maps 302 and to control various options of each network map 302. Controls 326 provide a wide range of controls related to the network map 302 and to various process control-related functions. Examples of the types of controls 326 that could be used with the network map 302 include filtering the type(s) of device(s) shown in the network map 302.

Figure 4:
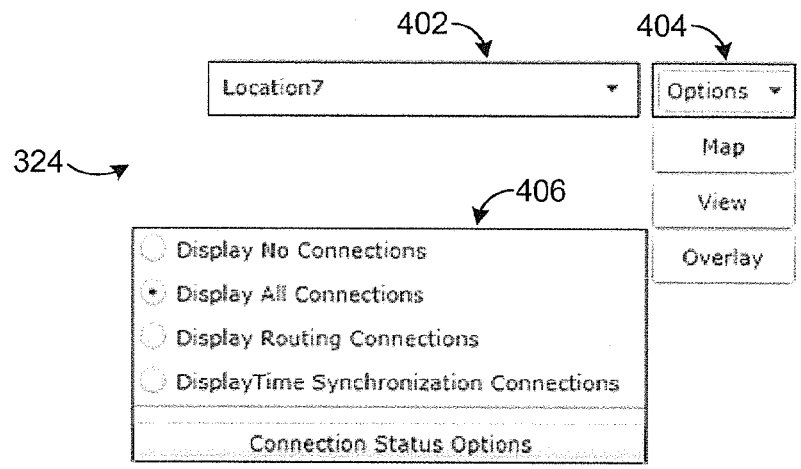
Figure 5:
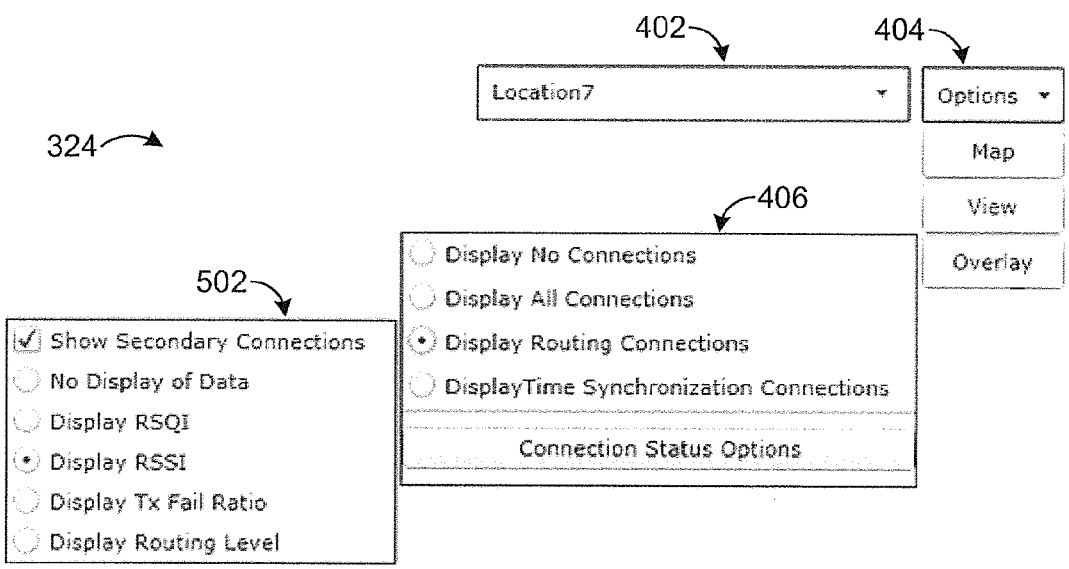

The controls 324 shown in FIG. 3 could be implemented as shown in FIGS. 4 and 5. In FIGS. 4 and 5, a drop-down menu 402 allows a user to select a particular location from a list of locations. The different locations can be associated with different wireless networks or different portions of the same wireless network, so each location is associated with a different network map 302.

A drop-down menu 404 allows a user to access various options for the selected network map 302. For example, a "maps" option in the drop-down menu 404 could give a user the option of opening a dialog box allowing the user to create a new map or delete/edit an existing map. The "maps" option in the drop-down menu 404 could also give a user the option of opening a dialog box to control which devices are included in a map. A "view" option in the drop-down menu 404 could be used to control how the network map 302 is displayed, such as by controlling an opacity of the map, whether grid lines are displayed in the map, and whether the map is locked in order to prevent changes to the map.

An "overlay" option in the drop-down menu 404 could be used to present a drop-down menu 406 to a user. The drop-down menu 406 can be used to control which communication paths are shown in the network map 302. In this example, the drop-down menu 406 allows the user to view no connections, all connections, only routing (data) connections, and only time synchronization connections. The "Connection Status Options" button in the drop-down menu 406 can be selected to view the options box 312.

Depending on the selection in the drop-down menu 406, a drop-down menu 502 can be used to further tailor the network map 302. In this example, the drop-down menu 502 allows a user to control whether secondary data connections are displayed in the network map 302. The drop-down menu 502 also allows a user to control what contents are presented in the labels 308 of the lines 306 in the network map 302.

FIGS. 6 and 7 illustrate additional pop-up windows that could be presented in association with a line 306 in the network map 302. In FIG. 3, the pop-up window 310 is associated with a primary communication path used for routing and clock synchronization. In FIG. 6, a pop-up window 600 is associated with a secondary communication path used for routing and clock synchronization. The pop-up window 600 identifies two devices associated with a communication path, as well as the purpose, statistics, and overall status of the communication path.

In FIG. 7, a pop-up window 700 is associated with a communication path used for clock synchronization only. The pop-up window 700 includes two devices associated with a communication path and indicates the direction of the flow of clock synchronization information. The pop-up window 700 also includes an indication that the pop-up window 700 is associated with a primary or secondary path for clock synchronization information. The pop-up window 700 further identifies various information associated with clock synchronization, such as a clock sigma, master address, and distribution level. In addition, the pop-up window 700 identifies statistics associated with the communication path and an overall status of the communication path.

Although FIGS. 3 through 7 illustrate one example of a graphical display 300 for reporting of communication path quality within a wireless network and related details, various changes may be made to FIGS. 3 through 7. For example, the layout and arrangement of the graphical display 300 are for illustration only. Also, the contents of the various pop-up windows 310, 600, 700 could vary depending on particular needs. In addition, the different ranges of values for the various statistics could be set in any suitable manner and have any suitable limits.

FIGS. 8 through 10 illustrate example reports for disclosing or using communication path quality within a wireless network according to this disclosure. In FIG. 8, a report 800 represents a "Connection Status Summary" report. This report 800 provides a user with detailed information about the status of communication paths for all devices that are joined in a given network or portion thereof. The overall status of each communication path can be calculated as described above, and various cells could be highlighted or otherwise identified based on the statuses (such as by highlighting cells associated with a "Poor" status in red). The RSQI, RSSI, and transmit success/fail ratio values can also be displayed in color or using other inductors (such as by displaying values falling within a "Poor" range in red and values falling within a "Fair" range in orange).

In FIG. 9, a report 900 represents a "Connection History" report. This report 900 provides a user with detailed information about the history of communication paths in a wireless network. For example, the report 900 here identifies different changes in connections involving various devices. The report 900 also identifies the statistics of the communication paths and the overall status of each communication path. Again, various cells could be highlighted or otherwise identified based on the statuses (such as by highlighting cells associated with a "Poor" status in red). Also, the RSQI, RSSI, and transmit success/fail ratio values can also be displayed in color or using other inductors (such as by displaying values falling within a "Poor" range in red and values falling within a "Fair" range in orange).

In FIG. 10, a report 1000 represents a "Device History" report. This report 1000 provides a user with detailed information about the history of communication paths used for routing and time synchronization by particular network nodes. This report 1000 indicates whether redundant connections are available at a node and can highlight nodes that lack redundant connections. The report 1000 may or may not identify the overall status of a communication path directly. However, the overall status of multiple communication paths could be used to identify whether a node truly has redundant connectivity. For instance, if a node has a "good" primary connection and a "poor" backup connection, the report 1000 could indicate that the node lacks redundant connectivity.

Although FIGS. 8 through 10 illustrate examples of reports for disclosing or using communication path quality within a wireless network, various changes may be made to FIGS. 8 through 10. For example, these reports are for illustration only. The content and arrangement of each report could be varied as desired, and other or additional reports could include the quality of a communication path or information that is based on the quality of a communication path.

Figure 11:
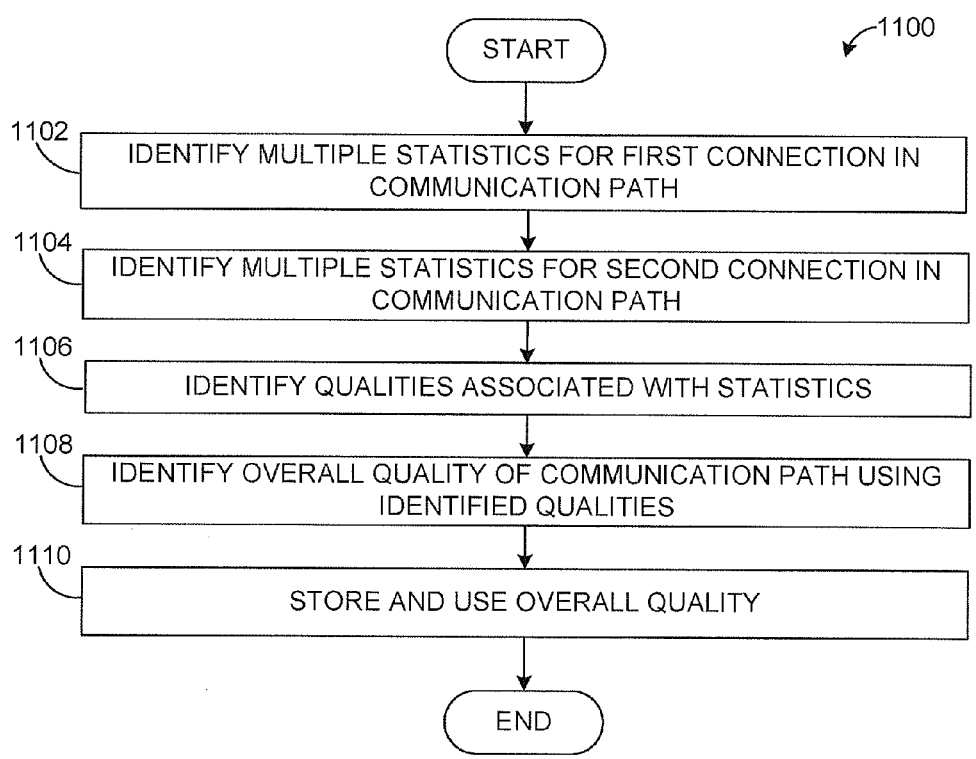
FIG. 11 illustrates an example method for reporting of communication path quality within a wireless network according to this disclosure.

FIG. 11 illustrates an example method 1100 for reporting of communication path quality within a wireless network according to this disclosure. As shown in FIG. 11, multiple statistics for a first connection in a communication path are identified at step 1102, and multiple statistics for a second connection in the communication path are identified at step 1104. This could include, for example, a monitoring application supported by the system manager 124 collecting or calculating RSQI, RSSI, and transmit success/fail ratio values for multiple connections between two network nodes. The system manager 124 could receive the statistics from one or more other devices, or the system manager 124 could calculate the statistics itself.

Qualities associated with the statistics are identified at step 1106. This could include, for example, the monitoring application supported by the system manager 124 using ranges of values as defined in the options box 312 to assign "good," "fair," and "poor" qualities to the individual RSQI, RSSI, and transmit success/fail ratio values.

An overall quality of the communication path is identified using the determined qualities at step 1108. This could include, for example, the system manager 124 identifying the worst quality of all statistics associated with the communication path. Note, however, that the overall quality could be calculated in any suitable manner using any number of determined qualities.

The overall quality of the communication path is used in some manner at step 1110. The specific use depends on the application. For example, the overall quality can be included in the graphical display 300 or in one or more reports. The system manager 124 could also use the overall quality to select communication paths used by devices in the wireless network or to reroute wireless traffic around poor communication paths. The overall quality could be used in any other suitable manner.

Although FIG. 11 illustrates one example of a method 1100 for reporting of communication path quality within a wireless network, various changes may be made to FIG. 11. For example, while shown as a series of steps, various steps in FIG. 11 could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying multiple statistics for a first wireless connection and multiple statistics for a second wireless connection, the wireless connections forming a bi-directional communication path between two of multiple wireless nodes in a wireless network, the two wireless nodes communicating directly with each other via the first and second wireless connections forming the bi-directional communication path;
   for each statistic, identifying one of multiple ranges in which the statistic lies;
   identifying an overall quality associated with the bi-directional communication path between the two wireless nodes using at least one of: the statistics and the identified ranges in which the statistics lie; and
   generating a graphical display that includes a map graphically representing at least some of the wireless nodes in the wireless network and communication paths between the at least some of the wireless nodes, the graphical display also including controls for defining the multiple ranges for the statistics, the graphical display further including the overall quality of the communication path between the two wireless nodes.

2. The method of claim 1, further comprising:
   assigning a quality value to each statistic for each wireless connection based on the range in which that statistic lies;
   wherein the overall quality is based on at least one of the quality values assigned to the statistics.

3. The method of claim 2, wherein the overall quality is based on a lowest of the quality values assigned to the statistics.

4. The method of claim 1, further comprising:
   adjusting at least one of the ranges for one or more of the statistics based on user input via the controls of the graphical display.

5. The method of claim 1, wherein:
   the first wireless connection transports data from a first of the wireless nodes to a second of the wireless nodes; and
   the second wireless connection transports data from the second wireless node to the first wireless node.

6. The method of claim 1, wherein the graphical display further includes options for controlling which types of communication paths between the wireless nodes are displayed in the map, the options including:
   an option to display all connections;
   an option to display routing-only connections;
   an option to display time synchronization-only connections; and
   an option to display secondary data connections.

7. The method of claim 1, further comprising:
   generating a report comprising at least one of: the overall quality of the communication path between the two wireless nodes and information based on the overall quality of the communication path between the two wireless nodes.

8. The method of claim 1, further comprising:
   repeating the identifying steps for one or more additional ones of the communication paths in the wireless network.

9. A method comprising:
   identifying multiple statistics for a first wireless connection and multiple statistics for a second wireless connection, the wireless connections forming a bi-directional communication path between two wireless nodes in a wireless network, the two wireless nodes communicating directly with each other via the first and second wireless connections forming the bi-directional communication path;
   assigning a quality value to each statistic for each wireless connection; and
   identifying an overall quality associated with the bi-directional communication path between the two wireless nodes based on at least one of the quality values assigned to the statistics;
   wherein, for each wireless connection, the statistics comprise a Received Signal Quality Indicator (RSQI), a Received Signal Strength Indication (RSSI), and a transmit success/fail ratio; and
   wherein the quality value assigned to each statistic comprises one of: a "good" quality, a "fair" quality, and a "poor" quality.

10. An apparatus comprising:
    at least one processing device configured to:
       obtain multiple statistics for a first wireless connection and multiple statistics for a second wireless connection, the wireless connections forming a bi-directional communication path between two of multiple wireless nodes in a wireless network such that the two wireless nodes are able to communicate directly with each other via the first and second wireless connections forming the bi-directional communication path;
       for each statistic, identify one of multiple ranges in which the statistic lies;

identify an overall quality associated with the bi-directional communication path between the two wireless nodes using at least one of: the statistics and the identified ranges in which the statistics lie; and generate a graphical display that includes a map graphically representing at least some of the wireless nodes in the wireless network and communication paths between the at least some of the wireless nodes, the graphical display also including controls for defining the multiple ranges for the statistics, the graphical display further including the overall quality of the communication path between the two wireless nodes; and at least one memory configured to store the overall quality.

11. The apparatus of claim 10, wherein:
the at least one processing device is further configured to assign a quality value to each statistic for each wireless connection based on the range in which that statistic lies; and
the at least one processing device is configured to identify the overall quality based on at least one of the quality values assigned to the statistics.

12. The apparatus of claim 11, wherein the at least one processing device is configured to identify the overall quality based on a lowest of the quality values assigned to the statistics.

13. The apparatus of claim 11, wherein the at least one processing device is further configured to adjust at least one of the ranges for one or more of the statistics based on user input via the controls of the graphical display.

14. The apparatus of claim 10, wherein:
the first wireless connection transports data from a first of the wireless nodes to a second of the wireless nodes; and
the second wireless connection transports data from the second wireless node to the first wireless node.

15. The apparatus of claim 10, wherein the graphical display further includes options for controlling which types of communication paths between the wireless nodes are displayed in the map, the options including:
an option to display all connections;
an option to display routing-only connections;
an option to display time synchronization-only connections; and
an option to display secondary data connections.

16. The apparatus of claim 10, wherein the at least one processing device is further configured to generate a report for presentation to a user, the report comprising at least one of: the overall quality of the communication path between the two wireless nodes and information based on the overall quality of the communication path between the two wireless nodes.

17. An apparatus comprising:
at least one processing device configured to:
obtain multiple statistics for a first wireless connection and multiple statistics for a second wireless connection, the wireless connections forming a bi-directional communication path between two wireless nodes in a wireless network such that the two wireless nodes are able to communicate directly with each other via the first and second wireless connections forming the bi-directional communication path;
assign a quality value to each statistic for each wireless connection; and
identify an overall quality associated with the bi-directional communication path between the two wireless nodes based on at least one of the quality values assigned to the statistics; and
at least one memory configured to store the overall quality;
wherein, for each wireless connection, the statistics comprise a Received Signal Quality Indicator (RSQI), a Received Signal Strength Indication (RSSI), and a transmit success/fail ratio; and
wherein the quality value assigned to each statistic comprises one of: a "good" quality, a "fair" quality, and a "poor" quality.

18. A non-transitory computer readable medium embodying a computer program, the computer program comprising computer readable program code for:
obtaining multiple statistics for a first wireless connection and multiple statistics for a second wireless connection, the wireless connections forming a bi-directional communication path between two of multiple wireless nodes in a wireless network such that the two wireless nodes are able to communicate directly with each other via the first and second wireless connections forming the bi-directional communication path;
for each statistic, identifying one of multiple ranges in which the statistic lies;
identifying an overall quality associated with the bi-directional communication path between the two wireless nodes using at least one of: the statistics and the identified ranges in which the statistics lie; and
generating a graphical display that includes a map graphically representing at least some of the wireless nodes in the wireless network and communication paths between the at least some of the wireless nodes, the graphical display also including controls for defining the multiple ranges for the statistics, the graphical display further including the overall quality of the communication path between the two wireless nodes.

19. The non-transitory computer readable medium of claim 18, further comprising computer readable program code for assigning a quality value to each statistic for each wireless connection based on the range in which that statistic lies;
wherein the overall quality is based on a lowest of the quality values assigned to the statistics.

20. A non-transitory computer readable medium embodying a computer program, the computer program comprising computer readable program code for:
obtaining multiple statistics for a first wireless connection and multiple statistics for a second wireless connection, the wireless connections forming a bi-directional communication path between two wireless nodes in a wireless network such that the two wireless nodes are able to communicate directly with each other via the first and second wireless connections forming the bi-directional communication path;
assigning a quality value to each statistic for each wireless connection; and
identifying an overall quality associated with the bi-directional communication path between the two wireless nodes based on at least one of the quality values assigned to the statistics;
wherein, for each wireless connection, the statistics comprise a Received Signal Quality Indicator (RSQI), a Received Signal Strength Indication (RSSI), and a transmit success/fail ratio; and
wherein the quality value assigned to each statistic comprises one of: a "good" quality, a "fair" quality, and a "poor" quality.

* * * * *